(12) United States Patent
Khedkar et al.

(10) Patent No.: US 11,216,558 B2
(45) Date of Patent: Jan. 4, 2022

(54) DETECTING MALWARES IN DATA STREAMS

(71) Applicant: Quick Heal Technologies Limited, Pune (IN)

(72) Inventors: Yogesh Khedkar, Pune (IN); Harshad Bhujbal, Pune (IN)

(73) Assignee: Quick Heal Technologies Limited, Maharashtra (IN)

( * ) Notice: Subject to any disclaimer, the term of this patent is extended or adjusted under 35 U.S.C. 154(b) by 169 days.

(21) Appl. No.: 16/675,254

(22) Filed: Nov. 6, 2019

(65) Prior Publication Data

US 2021/0089654 A1 Mar. 25, 2021

(30) Foreign Application Priority Data

Sep. 24, 2019 (IN) .............................. 201921038559

(51) Int. Cl.
  *G06F 21/56* (2013.01)
  *G06F 21/60* (2013.01)
  (Continued)

(52) U.S. Cl.
  CPC .......... *G06F 21/564* (2013.01); *G06F 21/563* (2013.01); *G06F 21/566* (2013.01);
  (Continued)

(58) Field of Classification Search
  CPC .... G06F 21/564; G06F 21/563; G06F 21/566; G06F 21/602; G06F 21/64; G06F 21/56; G06F 21/60; H04L 63/14; H04L 29/06
  See application file for complete search history.

(56) References Cited

U.S. PATENT DOCUMENTS 5,452,442 A * 9/1995 Kephart ................ G06F 21/564
   713/188
8,555,382 B2 * 10/2013 Michlin ................ G06F 21/564
   726/22

(Continued)

FOREIGN PATENT DOCUMENTS

EP  2362321 A1  8/2011
EP  2316090 B1  5/2014

(Continued)

OTHER PUBLICATIONS

Karin Ask, Automatic Malware Signature Generation, Oct. 16, 2006, 69 pages.

*Primary Examiner* — Jayesh M Jhaveri
(74) *Attorney, Agent, or Firm* — IPHorizons PLLC; Narendra Reddy Thapetta

(57) ABSTRACT

Detecting malwares in data streams of interest. In an embodiment, for each malware signature of interest, a malware sub-pattern that is likely to occur at low frequencies in clean data streams is identified. When scanning a data stream for malwares, each portion of the data stream is examined for match with a malware sub-pattern of a malware signature. If there is no match with any portion of the data stream, it is concluded that the data stream is free of a first malware corresponding to the malware signature. If there is a match with a first portion of the data stream, the data stream is examined around the first portion for the malware signature, wherein the data stream is concluded to contain the first malware if the data stream around the first portion is found to match the malware signature.

19 Claims, 8 Drawing Sheets

440 →

| | Signature |
|---|---|
| 441 → | BCDCPQABCD |
| 442 → | ZYXWVUTSRABCD |
| 443 → | CDCPQABFOMN |
| 444 → | P?ABCDA??QRST?Z |
| 445 → | QRBMPQABFOXYM |
| 446 → | R??QABC?BADY |
| 447 → | CDCQATYOMN |
| 448 → | QRBMQABCDCM |
| 449 → | PQABFMKOIJNL |
| 450 → | DCPQABCD |

460 →

| | Signature | Sub-sequence |
|---|---|---|
| 461 → | BCDCPQABCD | DCPQ |
| 462 → | ZYXWVUTSRABCD | ZYXW |
| 463 → | CDCPQABFOMN | QABF |
| 464 → | P?ABCDA??QRST?Z | QRST |
| 465 → | QRBMPQABFOXYM | QRBM |
| 466 → | R??QABC?BADY | BADY |
| 467 → | CDCQATYOMN | QATY |
| 468 → | QRBMQABCDCM | QRBM |
| 469 → | PQABFMKOIJNL | QABF |
| 470 → | DCPQABCD | DCPQ |

(51) Int. Cl.
    *G06F 21/64*     (2013.01)
    *H04L 29/06*     (2006.01)
(52) U.S. Cl.
    CPC .......... *G06F 21/602* (2013.01); *G06F 21/64* (2013.01); *H04L 63/14* (2013.01)

(56) References Cited

U.S. PATENT DOCUMENTS

| | | | |
|---|---|---|---|
| 9,747,445 B2 | 8/2017 | Friedrichs et al. | |
| 10,248,789 B2 | 4/2019 | August | |
| 2005/0265331 A1* | 12/2005 | Stolfo | G06F 21/55 370/389 |
| 2010/0011441 A1* | 1/2010 | Christodorescu | G06F 21/56 726/24 |
| 2011/0154495 A1 | 6/2011 | Stranne | |
| 2011/0202998 A1* | 8/2011 | Dullien | G06F 21/564 726/24 |
| 2013/0091571 A1* | 4/2013 | Lu | G06F 21/566 726/23 |
| 2014/0165203 A1* | 6/2014 | Friedrichs | G06F 21/552 726/24 |
| 2015/0007312 A1* | 1/2015 | Pidathala | H04L 63/145 726/22 |
| 2016/0012227 A1* | 1/2016 | Tuvell | G06F 16/245 726/23 |
| 2016/0212153 A1* | 7/2016 | Livshits | G06F 21/563 |
| 2020/0233962 A1* | 7/2020 | Chantry | G06F 8/311 |

FOREIGN PATENT DOCUMENTS

| | | |
|---|---|---|
| RU | 2654151 C1 | 5/2018 |
| WO | WO2019147384 A1 | 8/2019 |

* cited by examiner

| Byte Sequence | Prevalence Score |
|---|---|
| ABCD | 5 |
| BCDC | 3 |
| CDCP | 3 |
| DCPQ | 2 |
| CPQA | 2 |
| PQAB | 3 |
| QABC | 4 |
| CDCQ | 1 |
| DCQA | 1 |
| CQAB | 1 |
| BCDA | 1 |
| CDAC | 1 |
| DACA | 1 |
| ACAB | 1 |
| DCPA | 1 |

| |
|---|
| ABCDCPQABCD |
| BCDCQABCD |
| PQABCDACAB |
| CDCPQABCD |
| BCDCPA |

FIG. 4A

| Signature |
|---|
| BCDCPQABCD |
| ZYXWVUTSRABCD |
| CDCPQABFOMN |
| P?ABCDA??QRST?Z |
| QRBMPQABFOXYM |
| R??QABC?BADY |
| CDCQATYOMN |
| QRBMQABCDCM |
| PQABFMKOIJNL |
| DCPQABCD |

440 → 441–450

| Signature | Sub-sequence |
|---|---|
| BCDCPQABCD | DCPQ |
| ZYXWVUTSRABCD | ZYXW |
| CDCPQABFOMN | QABF |
| P?ABCDA??QRST?Z | QRST |
| QRBMPQABFOXYM | QRBM |
| R??QABC?BADY | BADY |
| CDCQATYOMN | QATY |
| QRBMQABCDCM | QRBM |
| PQABFMKOIJNL | QABF |
| DCPQABCD | DCPQ |

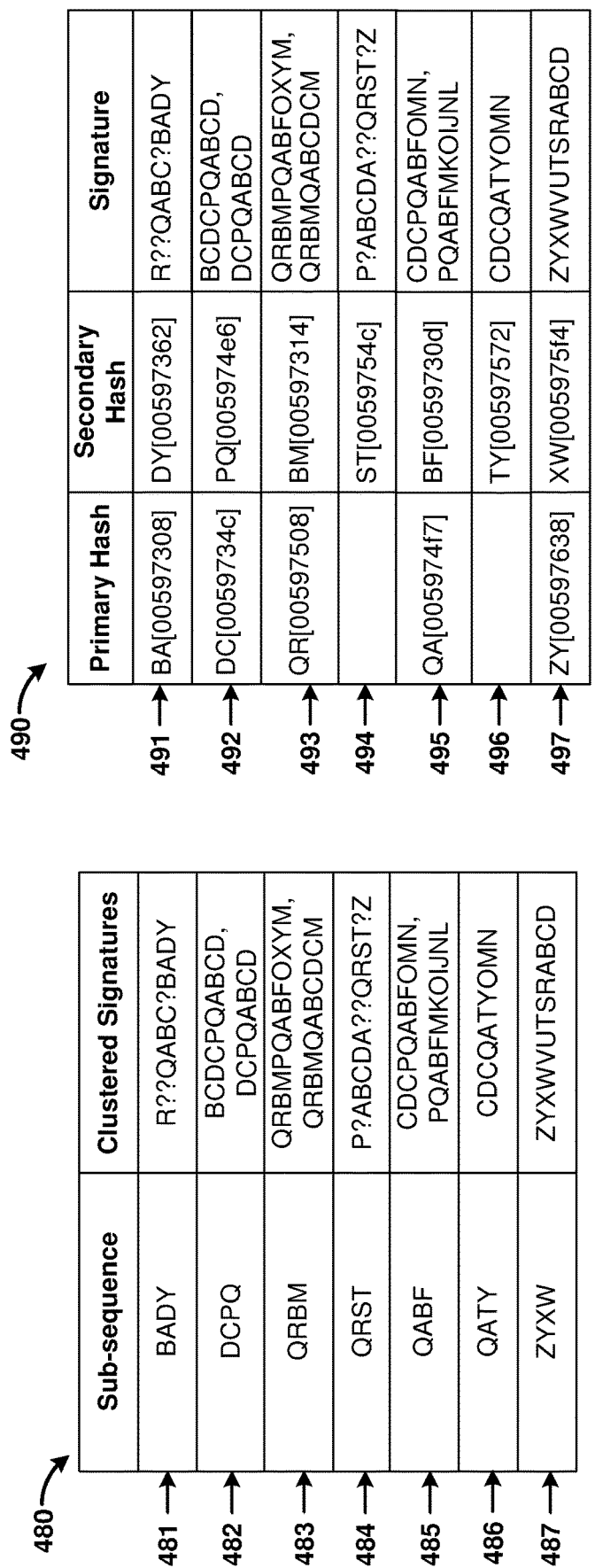

DETECTING MALWARES IN DATA STREAMS

PRIORITY CLAIM

The instant patent application is related to and claims priority from the co-pending India provisional patent application entitled, "SYSTEM FOR WILD-CARD MULTI PATTERN ANTI-VIRUS SIGNATURE SEARCHING", Serial No.: 201921038559, Filed: 24 Sep. 2019, naming as inventors Khedkar et al, attorney docket number: QHL-305-INPR, which is incorporated in its entirety herewith.

BACKGROUND OF THE DISCLOSURE

Technical Field

The present disclosure relates to computer security software, and more specifically to detecting malwares in data streams.

Related Art

A data stream refers to a sequence of bits received in a corresponding order. Data streams are often present in files stored on non-volatile storages, received on communications paths such as networks and point-to-point transmissions, etc.

Malware, or malicious software, is any program (executable code) that is harmful to a computer (including desktops, servers, switching devices, network elements, etc.), as is well-known in the relevant arts. The types of harm often include making other installed software programs inoperative, denying access to data stored on the computer, reducing throughput performance of the computer, stealing or corrupting of data, etc. Types of malware can include viruses, worms, Trojan horses and spyware. The malware could enter the computer of the user when the user downloads a file from an unknown source, through CD/DVD/USB drive or in other ways.

There is accordingly a general need to detect existence of malware in various data streams. The detection generally entails examining each data stream of interest for pre-specified patterns, which are referred to as signatures, as is also well-known in the relevant arts.

Aspects of the present disclosure provide for detection of malware in data streams using such malware signatures.

BRIEF DESCRIPTION OF THE DRAWINGS

Example embodiments of the present disclosure will be described with reference to the accompanying drawings briefly described below.

FIG. 4A depicts sample clean data streams and the corresponding frequencies of clean sequences determined from the sample data streams.

FIG. 4B depicts sample malware signatures and the corresponding malware sub-sequence for each signature.

FIG. 4C depicts clustering/grouping of malware signatures with identical malware sub-sequence.

FIG. 4D depicts the manner in which the malware sub-sequences are hashed into a multi-level hash in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
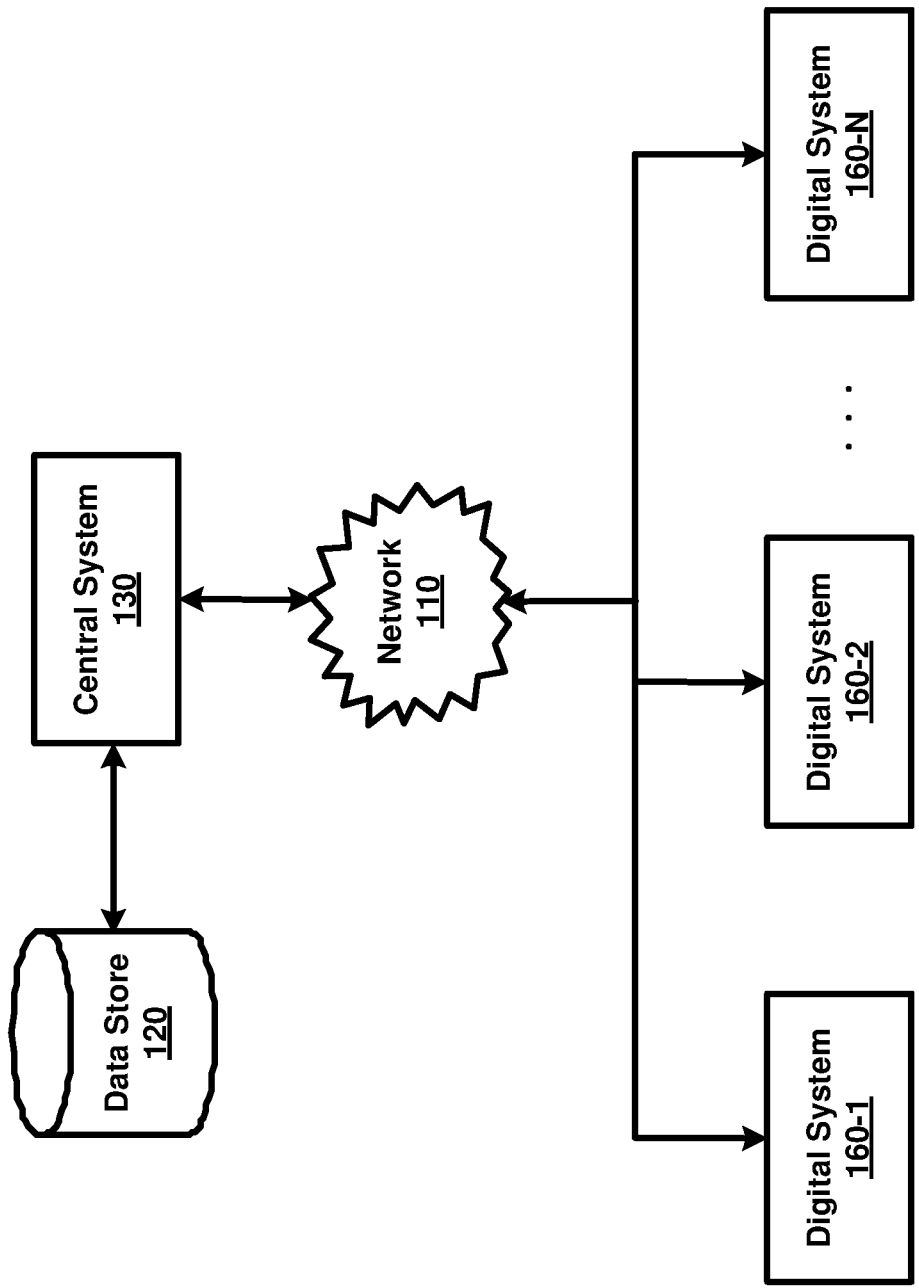
FIG. 1 is a block diagram illustrating an example environment (computing system) in which several aspects of the present disclosure can be implemented.

Aspects of the present disclosure are directed to detecting malwares in data streams of interest. In an embodiment, for each malware signature of interest, a malware sub-pattern that is likely to occur at low frequencies in clean data streams is identified. When scanning a data stream for malwares, each portion of the data stream is examined for match with a malware sub-pattern of a malware signature. If there is no match with any portion of the data stream, it is concluded that the data stream is free of a first malware corresponding to the malware signature. If there is a match with a first portion of the data stream, the data stream is examined around the first portion for the malware signature, wherein the data stream is concluded to contain the first malware if the data stream around the first portion is found to match the malware signature.

By selecting sub-pattern with low frequencies, each signature is associated with a corresponding bit sequence that occurs with lower frequency/probability. Use of such sub-pattern implies that non-existence of the signature (with the compared sub-sequence being a part) is determined with certainty and at a higher frequency based on a single comparison. When the non-existence is inconclusive based on such comparison with a sub-sequence, the rest of the examination operates to conclusively determine existence of the malware signature.

According to an aspect, each of the malware sub-patterns is a malware sub-sequence with all bits in successive contiguous positions. To identify sub-patterns, respective frequencies of occurrences of clean sequences in clean streams are first determined. A malware sub-sequence is selected as a portion of the malware signature matching a clean sequence with a low frequency (0 being lowest).

In an embodiment, the data stream of interest is scanned for existence of multiple malwares, with a respective malware signature of multiple malware signatures being designed for investigating existence of a corresponding malware. Each malware signature is accordingly identified with a respective malware sub-sequence.

According to another aspect, all of malware signatures identified with the same malware sub-sequence are clustered with that sub-sequence. Thus, if such malware sub-sequence does not match a first portion of the data stream, the first portion is concluded to be free of all of the clustered set of malware signatures. On the other hand, if such malware sub-sequence matches the first portion of the data stream, each of the malware signatures (clustered with the matching sub-sequence) is further examined around the first portion in the data stream for a match.

In an embodiment, the clustered information is stored in the form of a multi-level hash, with parts of the sub-sequences used as respective keys in the corresponding hash level. The throughput performance of scanning for malwares is further enhanced as a result.

According to another aspect, some of the malware signatures contain a corresponding wildcard character and the malware sub-sequence is selected from the remaining portion of the malware signature not containing the wildcard character. As a result, the wildcard character is examined only when there is a match of the malware sub-sequence with the first portion, thereby reducing degradation of throughput performance in the presence of such wildcards.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present disclosure can be implemented. The block diagram is shown containing network 110, data store 120, central system 130 and digital systems 160-1 to 160-N (N representing any arbitrary positive number). Digital systems 160-1 to 160-N are collectively or individually referred by referral numeral 160, as will be clear from the context.

Merely for illustration, only representative number/type of systems are shown in FIG. 1. Many environments often contain many more systems, both in number and type, depending on the purpose for which the environment is designed. Each block of FIG. 1 is described below in further detail.

Network 110 provides connectivity between digital systems 160-1 to 160-N and central system 130, and may be implemented using protocols such as Transmission Control Protocol (TCP) and/or Internet Protocol (IP), well-known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered.

An IP packet is said to be directed to a target system when the destination IP address of the packet is set to the IP address of the target system, such that the packet is eventually delivered to the target system by network 110. When the packet contains content such as port numbers, which specifies the destination application, the packet may be said to be directed to such application as well. The destination system may be required to keep the corresponding port numbers available/open, and process the packets with the corresponding destination ports. Network 110 may be implemented using any combination of wire-based or wireless mediums.

Data store 120 represents a non-volatile (persistent) storage facilitating storage and retrieval of a collection of data by central system 130. Data store 120 may be implemented as a database server using relational database technologies and accordingly provide storage and retrieval of data using structured queries such as SQL (Structured Query Language). Alternatively or in addition, data store 120 may be implemented as a file server providing storage and retrieval of data in the form of files organized as one or more directories, as is well-known in the relevant arts.

Though each of digital systems 160-1 to 160-N is shown representing a corresponding end user system such as a personal computer, workstation, mobile station, mobile phones, computing tablets, etc., it should be appreciated that digital systems may include other systems such as server systems, routers, bridges, firewalls, switches, etc., on which data streams are desired to be scanned for detection of malwares.

Central system 130 represents a server system which may aid digital systems to detect malwares in data streams. In an embodiment, central system 130 operates to provide malware signatures to each of digital systems 160, based on which malwares are detected. However, the signatures can be received by digital systems from other sources instead as well. It should be appreciated that malware signatures are continuously updated to reflect newly detected malwares and their characteristics. In an embodiment of the present disclosure, central system 130 operates in conjunction with digital systems 160 for efficient detection of malwares in data streams as described below.

3. Flowchart

Figure 2:
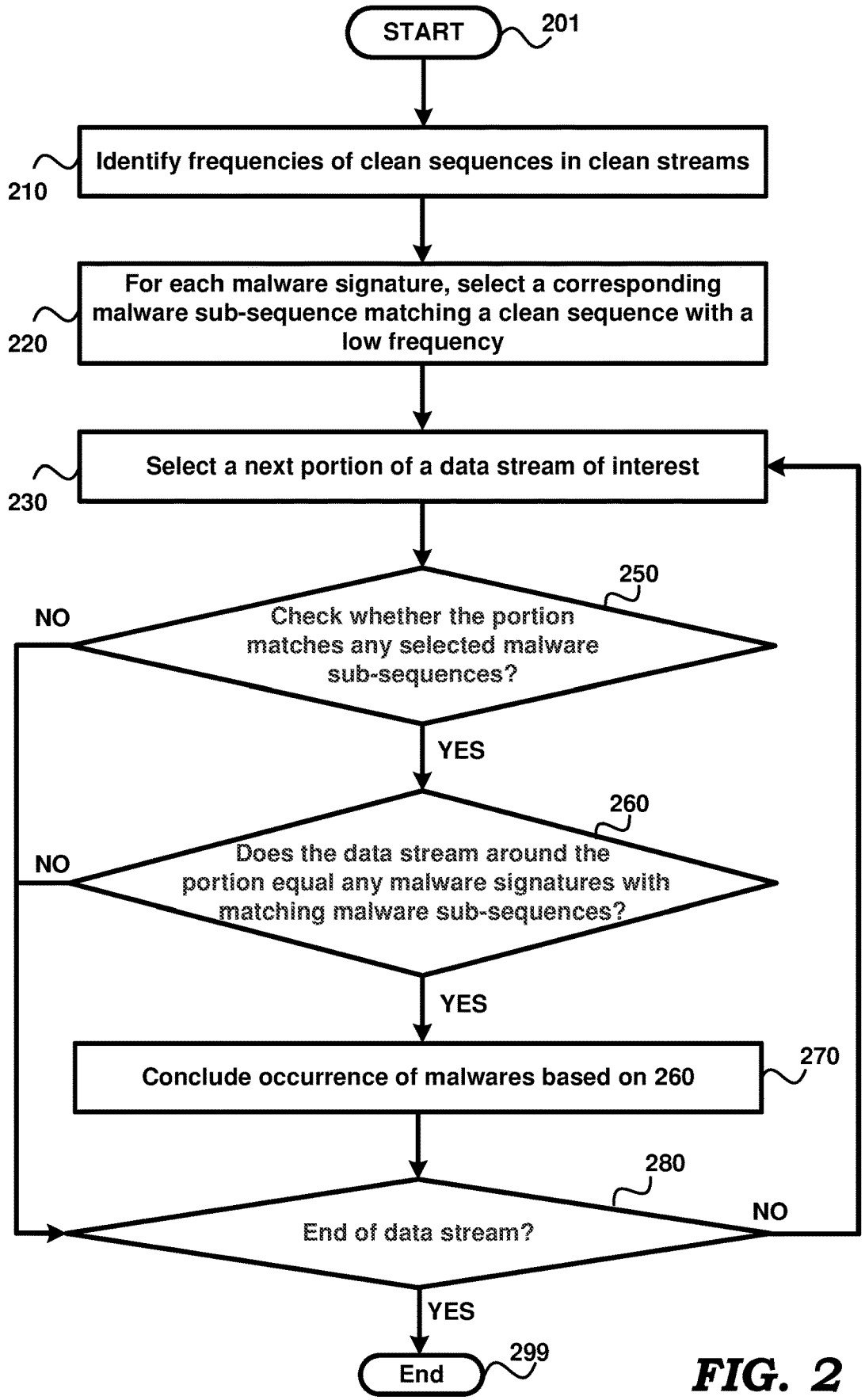
FIG. 2 is a flow chart illustrating the manner in which malware is detected according to an aspect of the present disclosure.

FIG. 2 is a flowchart illustrating the manner in which malwares are detected according to an aspect of the present disclosure. The flowchart is described with respect to the systems of FIG. 1 merely for illustration. However, many of the features can be implemented in other systems and/or other environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, central system 130 determines frequencies of clean patterns in clean streams. Clean streams are streams (data sequences) that are known to be free from malware. In an embodiment, clean streams are received in the form of files stored on the central system 130 and accordingly the content of such files is examined for such frequencies. The frequencies are conveniently hereafter referred to as prevalence scores for the respective clean patterns.

A pattern refers to a set of bits, with each bit in a corresponding relative position from the start. When the set of bits are in sequential and successive positions, a pattern is referred to as a sequence. As will be clear from the description below, it is computationally advantageous in some environments to use sequences instead of patterns with bits in non-sequential positions. Accordingly, the description is continued assuming that each clean pattern is a (clean)

sequence. In addition, the description is continued assuming that the clean sequences are of fixed length, specifically of four bytes each.

In step 220, for each malware signature, central system 130 selects a corresponding malware sub-sequence matching a clean sequence with a low frequency. A malware sub-sequence refers to a part of the malware signature, and needs to have the same number of bits as that of the clean patterns of step 210. It will be readily apparent to a skilled practitioner that such patterns with identical bit positions needs to be selected for such parts should non-contiguous patterns (instead of sequences) be used in step 210.

Thus, the prevalence scores of step 210 can be used to quickly determine the frequencies of clean sequences that are respectively identical to malware sub-sequences of the malware signature. A corresponding suitable sub-sequence with a respective low frequency may be selected for each of the malware signatures. In embodiments described below, the sub-sequences with lowest frequency (including zero) are shown to be selected. By choosing the sub-sequences of lowest frequency, the computational complexity in subsequent steps is reduced, as will be apparent to a skilled practitioner by reading the disclosure herein.

In step 230, digital system 160 selects a next portion of a data stream of interest. The number of bits (i.e., length) of the next portion needs to equal the length of the malware sub-sequences. For a comprehensive examination of the data stream, the next portion may be selected using a 'rolling-window' approach described in further detail below.

In step 250, digital system 160 checks whether the portion matches any selected malware sub-sequences. A match is determined to be present when each bit of the portion equals the corresponding bit in the same position of the malware sub-sequence. If a match is found (value "YES"), control passes to step 260, and to step 280 otherwise.

In step 260, for each of the matching malware sub-sequences, digital system 160 checks whether the data stream around the examined portion of step 250 equals the corresponding malware signature. Thus, it may be appreciated that different sets of bits (some before and/or after the matching bits) may be compared while processing for each malware signature. Control passes to step 270 if there are one or more equalities/matches (value "YES") and to step 280 otherwise.

In step 270, digital system 160 concludes that the malwares corresponding to the matching malware signatures exist in the respective examined parts (around the portion) of step 260. A suitable report may also be generated for users.

In step 280, digital system 160 determines whether there is additional data to be examined in the data stream. Control passes to step 299 if the end of data stream is reached, and otherwise to step 230 to continue processing of the next portion of the data stream. The flowchart ends in step 299.

It may be appreciated that steps 210 and 220 are described to be performed within central system 130, as these preparatory steps are useful for each of the digital systems 160. However, these steps 210/220 also may be performed within each digital system in alternative embodiments. Steps 230-280 are performed for each of the data streams, though the flow-chart is shown with respect to processing of a single data stream.

Thus, the flowchart of FIG. 2 operates to detect the presence of malwares in data streams of interest. The description is continued with respect to the details of the various blocks of FIG. 1 for implementing the flow-chart of FIG. 2 in an example implementation.

4. Example Implementation

Figure 3:
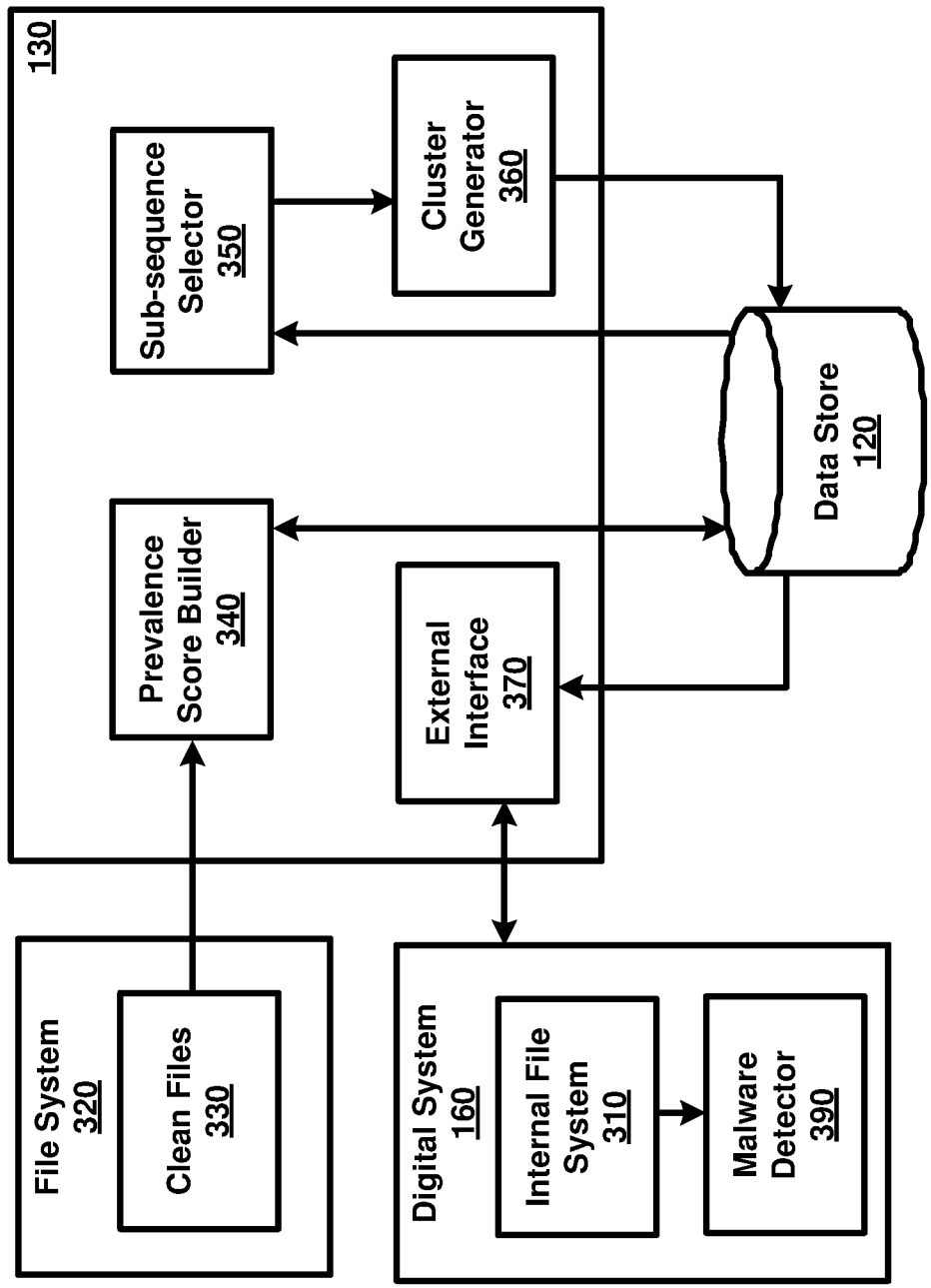
FIG. 3 is a block diagram illustrating the manner in which malware detection in data streams of interest is implemented in one embodiment.

FIG. 3 is a block diagram illustrating the details of implementation in one embodiment. The block diagram is shown containing file system 320, central system 130, data store 120, and digital system 160. Central system 130 is shown containing prevalence score builder 340, sub-sequence selector 350, cluster generator 360 and external interface 370. Digital system 160 is shown containing internal file system 310 and malware detector 390. Each of the blocks of FIG. 3 is described in detail below.

File system 320 stores a set of clean files 330 (files having content that is known to be not infected by any known malware). In one embodiment, file system 320 is a file server providing storage and retrieval of data in the form of files organized as one or more directories, as is well-known in the relevant arts.

Prevalence score builder 340 determines the prevalence scores for clean sequences in the set of clean files 330. The manner of determining prevalence scores in an example embodiment is described below though more complex approaches such as those based on machine learning can be used to identify non-contiguous bit patterns as will be apparent to a skilled practitioner.

Sub-sequence selector 350 selects suitable sub-sequence for each malware signature. As noted above, the sub-sequence matching a clean sequence with low prevalence score is selected. While the description below is provided with respect to using the lowest prevalence score, other considerations such as enhanced clustering noted below may be used in picking a suitable sub-sequence.

Cluster generator 360 groups malware signatures having identical malware sub-sequences. Such grouping facilitates the conclusion of non-match for all grouped signatures (avoiding the processing of step 260 for that portion of the data stream) based on comparison of the corresponding single malware sub-sequence, as will be described in further detail below as well. The grouping information including the grouped malware signatures and the corresponding malware sub-sequence may be stored in data store 120.

Data store 120 stores the prevalence scores, the predefined set of malware signatures and the clustering/grouping information. Internal file system 310 on digital system 160 contains data streams of interest that are required to be scanned for the existence of known malwares sought to be identified by corresponding signatures.

External interface 370 facilitates the interaction of central system 130 with digital systems 160. Specifically, external interface 370 provides the malware signatures, the corresponding sub-sequences and grouping information to malware detector 390.

Malware detector 390 on digital system 160 scans the files in internal file system 310 for detecting malwares using the information received from external interface 370. Any malwares identified in any of the data streams are accordingly suitably reported to users of the digital system.

Prevalence score builder 340, sub-sequence selector 350 and cluster generator 360 are shown implemented as part of central system 130, though some or all of such blocks can be implemented in each digital system 160 as well. Similarly, while file system 320 is shown external to central system 130, in alternative embodiments, file system 320 may be part of central system 130.

The description is continued with respect to illustrating some of the above noted features with respect to sample data.

5. Prevalence Scores

FIG. 4A depicts tables 410 and 420 respectively depicting sample clean files and the corresponding prevalence scores determined by prevalence score builder 340. Specifically, table 410 is shown with content data stream for five files 411-415, and table 420 is shown with byte sequence and prevalence scores. Column "Byte sequence" specifies the byte sequence in the clean files and column "Prevalence Score" specifies the frequency of occurrence of the byte sequence across all clean files in table 410. The associated rows are shown in table 420 for the sample clean files of table 410 in FIG. 4A.

In this illustrative embodiment, prevalence score builder 340 uses a fixed byte length of four bytes to traverse each of the clean files. Prevalence score builder 340 uses a rolling window to traverse the clean files. For example, when prevalence score builder 340 traverses file in row 411, the score builder identifies the following byte sequences and the respective frequency of occurrences for each byte sequence.

ABCD—2
BCDC—1
CDCP—1
DCPQ—1
CPQA—1
PQAB—1
QABC—1

Similarly, when prevalence score builder 340 traverses file in row 412, the score builder identifies the following byte sequences and the respective frequency of occurrences for each byte sequence.

BCDC—1
CDCQ—1
DCQA—1
CQAB—1
QABC—1
ABCD—1

Prevalence score builder 340 identifies that byte sequences ABCD and QABC already have occurrences in the first file. Therefore, the score builder aggregates the count for the respective byte sequences. Prevalence score builder 340 stores this count as prevalence score for the respective byte sequences in data store 120 (rows 421 and 427 in table 420).

Prevalence score builder 340 continues in the above manner for all clean files in table 410 and determines corresponding prevalence scores as shown in FIG. 4A.

6. Selecting Malware Sub-Sequences

FIG. 4B depicts sample malware signatures and the corresponding sub-sequences selected for the signatures in tables 440 and 460 respectively.

Table 440 depicts ten predefined malware signatures in rows 441-450. Malware signatures may contain wildcard characters as depicted in rows 444 and 446. Each wildcard character represents a single character.

For each malware signature, sub-sequence selector 350 selects a sub-sequence of bytes with the least prevalence score. In this illustrative embodiment, as stated above, prevalence score builder 340 uses fixed byte length of four bytes to traverse each of the clean files. Therefore, sub-sequence selector 350 also uses the same fixed length of four bytes to traverse malware signatures to select the corresponding sub-sequences. Sub-sequence selector 350 uses a rolling window to traverse the malware signatures.

For example, when sub-sequence selector 350 traverses signature in row 441, the sub-sequence selector 350 identifies the following sub-sequences and the corresponding prevalence score for each sub-sequence from the data store 120 [Rows 421-435 in table 420 of FIG. 4A]:

BCDC—3
CDCP—3
DCPQ—2
CPQA—2
PQAB—3
QABC—4
ABCD—5

Sub-sequence selector 350 does not select sub-sequences BCDC, CDCP, PQAB, QABC or ABCD for signature in row 411 as their respective prevalence scores are higher than those of sub-sequences DCPQ and CPQA. It is to be noted that sub-sequences DCPQ and CPQA both have the same low prevalence score of 2. Sub-sequence selector 350 sub-sequences DCPQ for signature in row 411. When multiple sub-sequences of same lowest prevalence score are found for a signature, one of the sub-sequences that has been selected for other malware signatures can be selected (to facilitate grouping). For example, for signature in row 450, sub-sequence selector 350 selects DCPQ as the malware sub-sequence since the sub-sequence has already been associated with signature in row 411 as described.

In some scenarios, sub-sequence selector 350 may not find an entry for a malware sub-sequence in the prevalence score table. For example, when sub-sequence selector 350 traverses signature in row 443, it identifies the following sub-sequences and the prevalence scores for each sub-sequence from the data store 120 [Rows 421-435 in table 420 of FIG. 4A]:

CDCP—1
DCPQ—1
CPQA—1
PQAB—3
QABF—NA (or 0)

Sub-sequence selector 350 identifies that sub-sequence QABF is not present in table 420. Hence the prevalence score of the sub-sequence QABF is considered to be zero. Accordingly, sub-sequence selector 350 selects 'QABF' for signature in row 443 since it is the sub-sequence with the least prevalence score. In an embodiment, sub-sequence selector 350 does not traverse the entire malware signature when a sub-sequence with prevalence score zero is identified. Alternatively, sub-sequence selector 350 may continue traversal for sub-sequences with zero score, but which are amenable to be grouped.

When processing malware signatures with wildcard characters, sub-sequence selector 350 selects contiguous sub-sequence of bytes excluding wildcards for prevalence score comparison. For example, sub-sequence selector 350 traverses signature in row 444 of table 440 and identifies the following sub-sequences and the prevalence score for each sub-sequence from table 420.

ABCD—4
BCDA—1
QRST—NA (or 0)

Sub-sequence selector 350 selects 'QRST', having the lowest score, for signature in row 444. Using similar approach, sub-sequence selector 350 may select sub-sequences for all the signatures in table 440 and populates table 460.

By selecting sub-sequences with low prevalence scores, each signature is associated with clean content that occurs with lower frequency/probability. As will be clear from the description below, use of such sub-sequences implies that non-existence of the signature (with the compared sub-sequence being a part) is determined with certainty and a higher frequency based on a single comparison. Even if the non-existence is inconclusive based on such comparison with a sub-sequence, it will be appreciated that step 260 operates to conclusively determine existence of the malware signature.

7. Generating Clusters for Malware Signatures

FIG. 4C depicts the manner in which malware signatures having identical malware sub-sequences are grouped for enhanced processing efficiency. In table 480, column "Sub-sequence" specifies malware sub-sequences and column "Clustered Signatures" specifies multiple signatures (of FIG. 4B) that are grouped under the same malware sub-sequence.

For example, cluster generator 360 identifies that rows 463 and 469 have identical malware sub-sequence QABF. Therefore, cluster generator 360 groups the corresponding malware signatures and places them in a single row 485 in table 480 for further processing. Similarly, cluster generator 360 groups signatures in rows 465 and 468 as they have identical malware sub-sequence QRBM. The group is placed in row 483 of table 480.

Such grouping facilitates the conclusion of non-match for all grouped signatures based on (single) comparison of the corresponding malware sub-sequence.

After clustering signatures, cluster generator 360 proceeds to store the malware sub-sequences and the grouped signatures in the form of a multi-level hash. It may be readily appreciated that such kind of multi-level hash facilitates efficient search of malware sub-sequences when scanning data streams of interest and quicker retrieval of the corresponding groups of malware signatures.

FIG. 4D depicts the manner in which the malware sub-sequences are hashed into a multi-level hash and stored in data store 120.

The multi-level hash contains a first level of hash referred to as primary hash and a second level of hash referred to as secondary hash. As noted earlier in the disclosure, each malware sub-sequence in this illustrative embodiment is of a fixed length of four bytes. Cluster generator 360 uses the first two bytes of the malware sub-sequence to generate the primary hash and the next two bytes to generate the secondary hash under the primary hash.

Columns "Primary Hash" and "Secondary Hash" in table 490 depict the primary and secondary hashes respectively. Column "Signatures" depicts the group of signatures associated with the malware sub-sequence. Columns "Primary Hash" and "Secondary Hash" contain data depicted as the respective two bytes used to generate the hash followed by the hash in square brackets [ ]. This is merely for the purpose of illustration. Actual data will contain only the hash values and not the bytes used to generate the respective hash.

For example, as described earlier, in row 482 of FIG. 4C, sub-sequence DCPQ has two associated signatures. Cluster generator 360 uses bytes 'DC' to generate a primary hash. For the purpose of illustration, cluster generator 360 is shown to use DJB hash function to generate the primary and the secondary hashes although any hashing function could be used as is well-known in the relevant arts. Cluster generator 360 uses bytes 'PQ' to generate the secondary hash under the primary hash. Cluster generator 360 then associates the two signatures, in this case signatures 'BCDCPQABCD' and 'DCPQABCD', to the secondary hash. Thus, signatures in rows 441 and 450 of FIG. 4B are associated as shown in row 492 of table 490 in FIG. 4D.

If there are multiple secondary hashes under the same primary hash, cluster generator 360 sorts all the secondary hashes under the primary hash in ascending order, as shown in table 490 (rows 493/494 and 495/496).

Cluster generator 360 builds the multi-level hash for all the selected sub-sequences for all malware signatures in table 480 of FIG. 4C and populates table 490.

8. Detecting Malware in Data Streams of Interest

Figure 5:
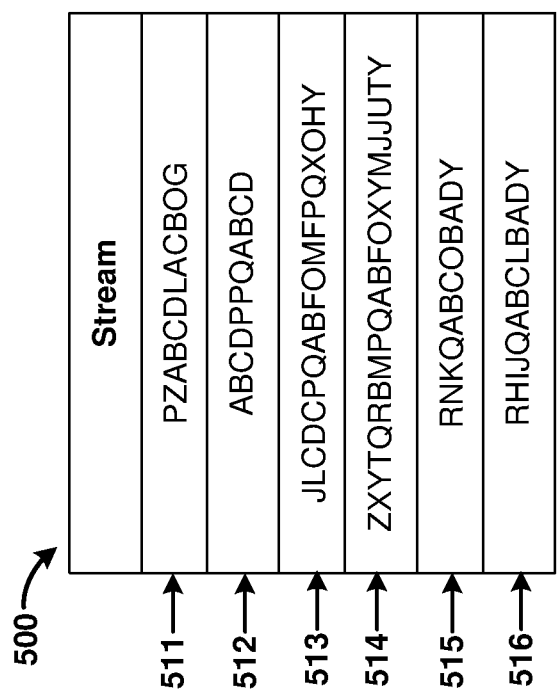
FIG. 5 depicts sample data streams of interest which need to be scanned for detecting presence of malware.

FIG. 5 depicts six sample data streams of interest in rows 511-516 located in internal file system 310 of digital system 160. Merely for illustration, streams of short length are shown though typical data streams would contain many thousands/millions of bytes. These data streams are to be scanned for detecting the presence of malware.

Malware detector 390 on digital system 160 receives the multi-level hash representing the grouping information (of various signatures and sub-sequences) from central system 130 and uses the same for detecting known malwares in the data streams of interest.

Malware detector 390 uses steps 230-280 in the flowchart of FIG. 2 to detect malwares in each data stream of interest. Specifically, malware detector first checks for a match of a part of the data stream with the primary hash. If a match is found, the malware detector checks for a match of the next part of the data stream in the secondary hash under the primary hash. It may be appreciated that since the secondary hash has been sorted in ascending order, the malware detector performs a binary search to check for a match to make the process efficient. If both the primary and secondary hash match, the malware detector checks for a complete match of the data stream portion around the portion of the matched parts in the corresponding set of malware signatures associated with the secondary hash. If one or more matches are identified, the malware detector concludes that the portion of the data stream of interest contains malwares corresponding to the matched malware signatures.

For example, with respect to the data stream in row 511 of FIG. 5. In step 210. Malware detector 390 selects byte sequence PZAB and checks whether the byte sequence matches any of the malware sub-sequences in table 490 of FIG. 4D. Malware detector 390 does not find a match. Hence, malware detector 390 proceeds to step 280 where it selects byte sequence ZABC and repeats step 250 of flowchart. In this manner, malware detector 390 continues until the end of data stream in row 511. Malware detector 390 does not find any matches. Therefore, malware detector 390 concludes that the data stream is free from all known malwares.

In one scenario, malware detector 390 may find a partial match in the multi-level hash. For example, when malware detector 390 selects byte sequence QABC as part of examining data stream in row 512, malware detector 390 finds a match in the primary hash (row 495 of FIG. 4D) but does not find a corresponding match in the secondary hash as part of step 250. Hence, malware detector 390 proceeds to step 280 where it selects byte sequence ABCD and repeats step 250 of flow-chart. Malware detector 390 proceeds in this manner until end of the data stream but does not find any matches. Therefore, the malware detector concludes that data stream 512 does not contain known malwares.

In some scenarios, malware detector 390 may find a corresponding match with a malware sub-sequence in the multi-level hash but the portion of data stream around the matched byte sequence may not match any of the malware signatures associated with the malware sub-sequence. For example, when malware detector 390 scans the data stream in row 513, it selects byte sequence QABF as part of step 230. Malware detector 390 then finds a match in step 250 (with malware sub-sequence in row 495). Therefore, malware detector 390 proceeds to step 260 to check if the data stream in row 513 around the matched portion matches any of the malware signatures associated with the malware sub-sequence QABF. In the current illustration, as can be seen in row 495 of FIG. 4D, there are two signatures. However, malware detector 390 finds that none of the signatures match the portion of the data stream around the matched byte sequence. Therefore, the malware detector proceeds to step 280 to check for end of data stream. Since the end of data stream is not yet reached, malware detector 390 selects byte sequence ABFO in step 250. However, proceeding in this manner, malware detector 390 does not find any further matches with the malware sub-sequences. Therefore, the malware detector concludes that the data stream 513 does not contain any of the known malwares.

With respect to data stream 514, malware detector 390 detects a no-match with any of the sub-sequences upon examining each of the byte sequences ZXYT, XYTQ, YTQR, and TQRB. However, a match is detected with row 493 of table 490 upon examining QRBM. Entry 493 contains two signatures QRBMPQABFOXYM and QRBMQABCDCM. When data stream ZXYTQRBMPQABFOXYMJJUTY is examined around QRBM (i.e., including portions before and after QRBM), the first signature is found to exist while the second one does not. Thus the malware corresponding to the first signature is found to exist in data stream 514.

In some scenarios, malware detector 390 may find that the matching sub-sequence in step 250 has associated malware signature(s) containing wildcard characters. For example, consider data stream in row 515. Malware detector 390 finds a matching malware sub-sequence (row 491) when executing step 250. Malware detector 390 checks whether the data stream around the matched portion (in this case, around the byte sequence BADY) matches the signature in row 491. The matching may be performed using any well-known pattern-matching approach. Malware detector 390 identifies that the data stream in row 515 matches the signature in row 491 with the wildcard character "?" replaced by a single character. Specifically, the two wildcard characters between R and Q in the signature, when replaced with characters N and K respectively in data stream 515, and the wildcard character between C and B in the signature, when replaced with character O in data stream 515 result in the data stream matching the signature. Therefore, malware detector 390 concludes that data stream in row 515 contains a known malware. The signature and the data stream are reproduced here for convenience:

Signature in row 491: R??QABC?BADY
Data stream in row 515: RNKQABCOBADY

When data stream 516 is examined, malware detector 390 finds a match with the malware sub-sequence BADY (row 491 of table 490). However, when the data stream is examined for a match of the malware signature with wildcard characters, no match is found as there are two wildcard characters between R and Q in the signature whereas there are three characters between R and Q (HIJ) in data stream 516. Therefore, malware detector 390 concludes that the data stream 516 does not contain any of the known malwares. The signature and the data stream are reproduced here for convenience:

Signature in row 491: R??QABC?BADY
Data stream in row 516: RHIJQABCLBADY

Thus, the malware detector detects malwares in data streams of interest by supporting malware signatures with wildcard characters also.

It should be appreciated that the features described above can be implemented in various embodiments as a desired combination of one or more of hardware, software, and firmware. The description is continued with respect to an embodiment in which various features are operative when the software instructions described above are executed.

9. Digital Processing System

Figure 6:
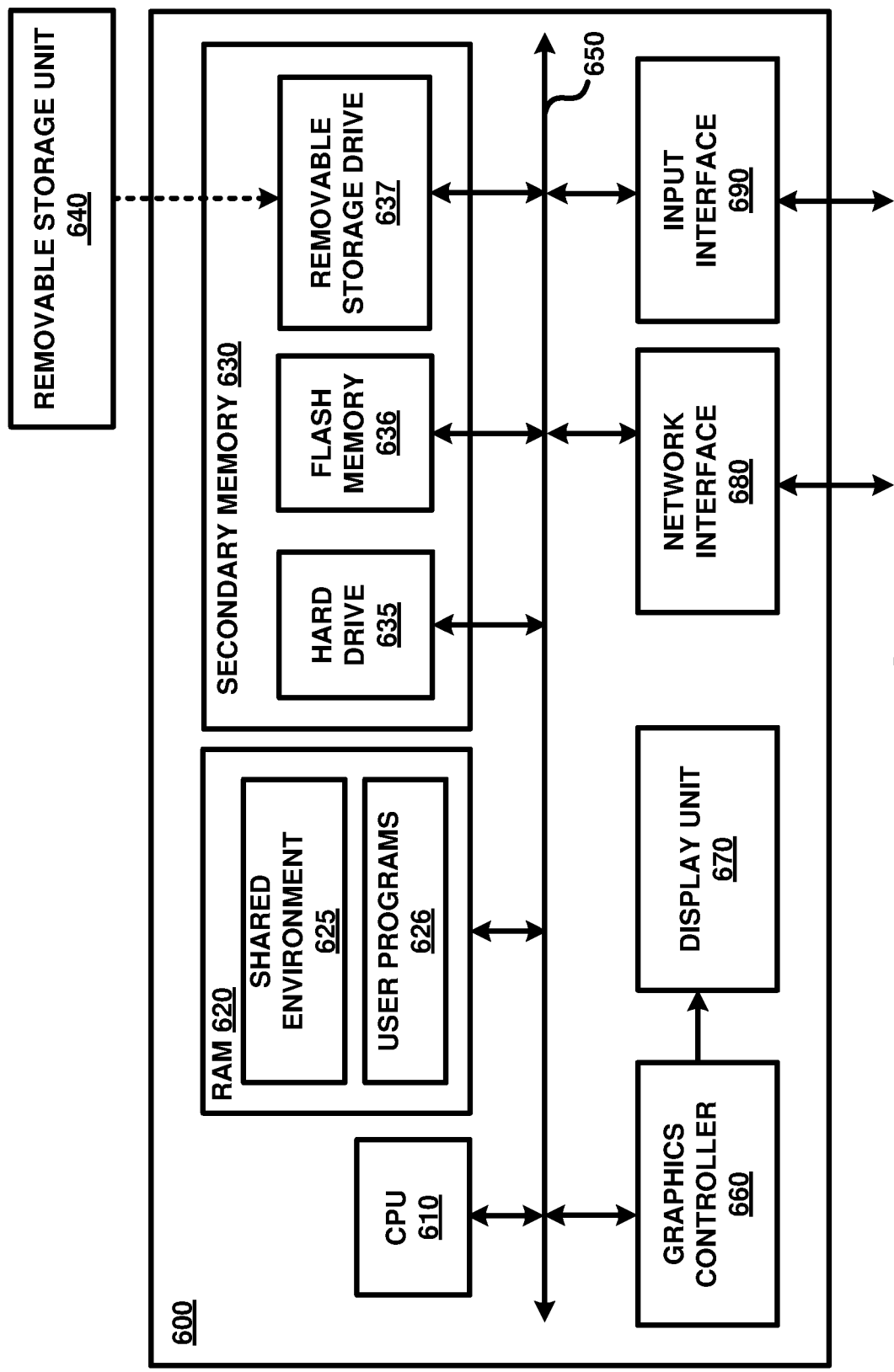
FIG. 6 is a block diagram illustrating the details of a digital processing system in which several aspects of the present disclosure are operative by execution of appropriate software instructions.

FIG. 6 is a block diagram illustrating the details of digital processing system 600 in which various aspects of the present disclosure are operative by execution of appropriate executable modules. Digital processing system 600 may correspond to one of digital system 160 and central system 130.

Digital processing system 600 may contain one or more processors such as a central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well-known in the relevant arts. The components of FIG. 6 are described below in further detail.

CPU 610 may execute instructions stored in RAM 620 to provide several features of the present disclosure. CPU 610 may contain multiple processing units, with each processing unit potentially being designed for a specific task. Alternatively, CPU 610 may contain only a single general-purpose processing unit. In addition, CPU 610 may be supported by CAM (content addressable memory) structures for examination of complex patterns.

RAM 620 may receive instructions from secondary memory 630 using communication path 650. RAM 620 is shown currently containing software instructions constituting shared environment 625 and/or other user programs 626 (such as the blocks of central system 130 or digital system 160 shown in FIG. 3). In addition to shared environment 625, RAM 620 may contain other software programs such as device drivers, virtual machines, etc., which provide a (common) run time environment for execution of other/user programs.

Graphics controller 660 generates display signals (e.g., in RGB format) to display unit 670 based on data/instructions received from CPU 610. Display unit 670 contains a display screen to display the images defined by the display signals. Input interface 690 may correspond to a keyboard and a pointing device (e.g., touch-pad, mouse) and may be used to provide inputs. Network interface 680 provides connectivity to a network (e.g., using Internet Protocol), and may be used to communicate with other systems (of FIG. 1) connected to the networks (110).

Secondary memory 630 may contain hard drive 635, flash memory 636, and removable storage drive 637. Secondary memory 630 may store the data (for example, internal file system 310 in case of digital system 160 and clean files 330 in case of file system 320) and software instructions (for example, for implementing the various features of the present disclosure as shown in FIG. 2, etc.), which enable digital processing system 600 to provide several features in accordance with the present disclosure. The code/instructions stored in secondary memory 630 may either be copied to RAM 620 prior to execution by CPU 610 for higher execution speeds, or may be directly executed by CPU 610.

Some or all of the data and instructions may be provided on removable storage unit 640, and the data and instructions may be read and provided by removable storage drive 637 to CPU 610. Removable storage unit 640 may be implemented using medium and storage format compatible with removable storage drive 637 such that removable storage drive 637 can read the data and instructions. Thus, removable storage unit 640 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 630. Volatile media includes dynamic memory, such as RAM 620. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 650. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

10. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of detecting malware in data streams, said method comprising:
    identifying a malware sub-pattern that is likely to occur at low frequencies in clean data streams known to be free from malware, said malware sub-pattern being a portion of a malware signature which is designed for investigating existence of a first malware in data streams;
    checking whether each portion of a data stream of interest matches said malware sub-pattern identified from among said clean data streams;
    based on said checking, if there is no match with any portion of said data stream, concluding that said data stream is free of said first malware; and
    based on said checking, if there is a match with a first portion of said data stream, further examining said data stream around said first portion for said malware signature, wherein said data stream is concluded to contain said first malware if said data stream around said first portion is found to match said malware signature.

2. The method of claim 1, wherein said malware sub-pattern is a malware sub-sequence, wherein said identifying comprises:
    determining respective frequencies of occurrences of clean sequences in a plurality of clean streams; and
    selecting as said malware sub-sequence a portion of said malware signature matching a clean sequence with a low frequency.

3. The method of claim 2, wherein said data stream of interest is scanned for existence of a plurality of malwares,
    wherein a respective malware signature of a plurality of malware signatures is designed for investigating existence of corresponding one of said plurality of malwares,
    wherein each of plurality of malware signatures is identified with a respective malware sub-sequence of a plurality of malware sub-sequences,
    wherein said identifying, said checking, said concluding and said examining are performed for each malware signature of said plurality of malware signatures.

4. The method of claim 3, further comprising clustering all of said plurality of malware signatures identified with the same malware sub-sequence, wherein a first set of malware signatures are clustered with a first malware sub-sequence, if said first malware sub-sequence does not match said first portion of said data stream in said checking, said first portion is concluded to be free of all of said first set of malware signatures; and if said first malware sub-sequence matches said first portion of said data stream in said checking, all of first set of malware signatures are examined around said first malware sub-sequence in said data stream for a match.

5. The method of claim 4, wherein said plurality of malware sub-sequences are stored in the form of a multi-level hash, with one part of each malware sub-sequence constituting a first level of hash and another part of each malware sub-sequence constituting a second level of hash,
wherein each set of malware signatures are stored associated with the second level of hash.

6. The method of claim 1, wherein said malware signature comprises a wildcard character, wherein said malware sub-sequence is identified from the remaining portion of the malware signature not containing said wildcard character,
wherein said wildcard character is examined only when there is a match of said malware sub-sequence with said first portion.

7. The method of claim 1, wherein said identifying is performed on a central system, and
wherein said checking, said examining and said concluding are performed in each of a plurality of digital systems.

8. A non-transitory machine readable medium storing one or more sequences of instructions for detecting malware in data streams, wherein execution of the one or more instructions by one or more processors contained in a digital system enables the digital system to perform the actions of:
receiving a malware sub-pattern that is likely to occur at low frequencies in clean data streams known to be free from malware, said malware sub-pattern being a portion of a malware signature which is designed for investigating existence of a first malware in data streams;
checking whether each portion of a data stream of interest matches said malware sub-pattern identified from among said clean data streams;
based on said checking, if there is no match with any portion of said data stream, concluding that said data stream is free of said first malware; and
based on said checking, if there is a match with a first portion of said data stream, further examining said data stream around said first portion for said malware signature, wherein said data stream is concluded to contain said first malware if said data stream around said first portion is found to match said malware signature.

9. The non-transitory machine readable medium of claim 8, wherein said malware sub-pattern is a malware sub-sequence, wherein said identifying comprises:
determining respective frequencies of occurrences of clean sequences in a plurality of clean streams; and
selecting as said malware sub-sequence a portion of said malware signature matching a clean sequence with a low frequency.

10. The non-transitory machine readable medium of claim 9, wherein said data stream of interest is scanned for existence of a plurality of malwares,
wherein a respective malware signature of a plurality of malware signatures is designed for investigating existence of corresponding one of said plurality of malwares,
wherein each of said plurality of malware signatures is identified with a respective malware sub-sequence of a plurality of malware sub-sequences,
wherein said identifying, said checking, said concluding and said examining are performed for each malware signature of said plurality of malware signatures.

11. The non-transitory machine readable medium of claim 10, further comprising clustering all of said plurality of malware signatures identified with the same malware sub-sequence, wherein a first set of malware signatures are clustered with a first malware sub-sequence,
if said first malware sub-sequence does not match said first portion of said data stream in said checking, said first portion is concluded to be free of all of said first set of malware signatures; and
if said first malware sub-sequence matches said first portion of said data stream in said checking, all of first set of malware signatures are examined around said first malware sub-sequence in said data stream for a match.

12. The non-transitory machine readable medium of claim 11, wherein said plurality of malware sub-sequences are stored in the form of a multi-level hash, with one part of each malware sub-sequence constituting a first level of hash and another part of each malware sub-sequence constituting a second level of hash,
wherein each set of malware signatures are stored associated with the second level of hash.

13. The non-transitory machine readable medium of claim 8, wherein said malware signature comprises a wildcard character, wherein said malware sub-sequence is identified from the remaining portion of the malware signature not containing said wildcard character,
wherein said wildcard character is examined only when there is a match of said malware sub-sequence with said first portion.

14. A central server comprising:
at least one memory unit to store instructions; and
at least one processor to execute the instructions to cause said central server to perform the actions of:
identifying a plurality of malware sub-patterns, wherein each of the plurality of malware sub-patterns is likely to occur at low frequencies in clean data streams known to be free from malware, said each of the plurality of malware sub-patterns being a portion of a malware signature designed for investigating existence of a first malware in data streams; and
sending said plurality of malware sub-patterns to a client system,
wherein said client system comprising corresponding memory and a corresponding processor is configured to execute instructions stored in said corresponding memory to cause the client system to perform the actions of:
receiving said plurality of malware sub-patterns from said central server;
checking whether each portion of a data stream of interest matches one or more of said plurality of malware sub-patterns identified from among said clean data streams;
based on said checking, if there is no match with any portion of said data stream, concluding that said data stream is free of said first malware; and based on said checking, if there is a match with a first portion of said data stream, further examining said data stream around said first portion for said malware signature, wherein said data stream is concluded to contain said first malware if said data stream around said first portion is found to match said malware signature.

15. The central server of claim 14, wherein said malware sub-pattern is a malware sub-sequence, wherein said identifying comprises:

determining respective frequencies of occurrences of clean sequences in a plurality of clean streams; and selecting as said malware sub-sequence a portion of said malware signature matching a clean sequence with a low frequency.

16. The central server of claim 15, wherein said data stream of interest is scanned for existence of a plurality of malwares, wherein a respective malware signature of a plurality of malware signatures is designed for investigating existence of corresponding one of said plurality of malwares, wherein each of plurality of malware signatures is identified with a respective malware sub-sequence of a plurality of malware sub-sequences, wherein said identifying, said checking, said concluding and said examining are performed for each malware signature of said plurality of malware signatures.

17. The central server of claim 16, further comprising clustering all of said plurality of malware signatures identified with the same malware sub-sequence, wherein a first set of malware signatures are clustered with a first malware sub-sequence, if said first malware sub-sequence does not match said first portion of said data stream in said checking, said first portion is concluded to be free of all of said first set of malware signatures; and if said first malware sub-sequence matches said first portion of said data stream in said checking, all of first set of malware signatures are examined around said first malware sub-sequence in said data stream for a match.

18. The central server of claim 17, wherein said plurality of malware sub-sequences are stored in the form of a multi-level hash, with one part of each malware sub-sequence constituting a first level of hash and another part of each malware sub-sequence constituting a second level of hash, wherein each set of malware signatures are stored associated with the second level of hash.

19. The central server of claim 14, wherein said malware signature comprises a wildcard character, wherein said malware sub-sequence is identified from the remaining portion of the malware signature not containing said wildcard character, wherein said wildcard character is examined only when there is a match of said malware sub-sequence with said first portion.

* * * * *